(12) United States Patent
Nientiedt (10) Patent No.: US 8,233,906 B2
(45) Date of Patent: Jul. 31, 2012

(54) METHOD AND ARRANGEMENT FOR DETERMINATION OF THE RADIO COVERAGE IN A MULTICELL MOBILE RADIO SYSTEM

(75) Inventor: Robert Nientiedt, Delbrück (DE)

(73) Assignee: Siemens Enterprise Communications GmbH & Co. KG, Munich (DE)

(*) Notice: Subject to any disclaimer, the term of this patent is extended or adjusted under 35 U.S.C. 154(b) by 1107 days.

(21) Appl. No.: 11/990,657

(22) PCT Filed: Aug. 3, 2006

(86) PCT No.: PCT/EP2006/065022
§ 371 (c)(1),
(2), (4) Date: Feb. 19, 2008

(87) PCT Pub. No.: WO2007/023074
PCT Pub. Date: Mar. 1, 2007

(65) Prior Publication Data
US 2009/0253436 A1    Oct. 8, 2009

(30) Foreign Application Priority Data
Aug. 23, 2005  (DE) .......................... 10 2005 039 863

(51) Int. Cl.
*H04W 40/00* (2009.01)
(52) U.S. Cl. ...................................... 455/446; 455/456.5
(58) Field of Classification Search .................. 455/423, 455/446, 456.1–456.5
See application file for complete search history.

(56) References Cited

U.S. PATENT DOCUMENTS

| 5,987,328 A | 11/1999 | Ephremides |
| 6,839,560 B1 * | 1/2005 | Bahl et al. .................. 455/456.1 |
| 2005/0227724 A1 * | 10/2005 | Tsai .............................. 455/525 |

FOREIGN PATENT DOCUMENTS

| DE | 10 2004 010 182 B3 | 7/2005 |
| EP | 0903880 A2 | 3/1999 |
| EP | 1098544 A2 | 5/2001 |
| EP | 1154661 A2 | 11/2001 |
| GB | 2361387 A | 10/2001 |
| WO | WO 0128272 A1 | 4/2001 |

* cited by examiner

*Primary Examiner* — Steven Lim (57) ABSTRACT

A method for determination of a radio coverage and a method for positional determination of a mobile terminal in a multicellular mobile radio system in which the actual received field strength for several or all base stations is measured at a number of measuring points in differing locations. The measured values for the actual received field strengths are entered in a databank as actual local values. Interpolated values are calculated from the actual received field strengths for virtual measuring points lying between the measuring points and the base stations and entered in the databank. Substitute values for the received field strengths are calculated for geographical positions at which neither measured nor interpolated values for the received field strengths are available, the substitute values being calculated from the relevant transmitter power, the distance from the relevant base station to said geographical point and a propagation model and entered in the databank.

16 Claims, 5 Drawing Sheets

|  | Field strength in dBm | | | | | | | | |
|---|---|---|---|---|---|---|---|---|---|
|  | AP1 | AP2 | AP3 | AP4 | AP5 | AP6 | AP7 | AP8 | AP9 |
| AP1 |  | -50 | -65 | -50 | -55 | -65 | -65 | -65 | -70 |
| AP2 | -50 |  | -50 | -55 | -50 | -55 | -65 | -65 | -70 |
| AP3 | -65 | -50 |  | -65 | -55 | -50 | -70 | -65 | -60 |
| AP4 | -50 | -55 | -65 |  | -50 | -60 | -50 | -55 | -65 |
| AP5 | -55 | -50 | -55 | -50 |  | -50 | -55 | -50 | -50 |
| AP6 | -65 | -55 | -50 | -60 | -50 |  | -60 | -55 | -50 |
| AP7 | -60 | -65 | -70 | -50 | -55 | -65 |  | -50 | -60 |
| AP8 | -65 | -60 | -65 | -55 | -50 | -55 | -50 |  | -50 |
| AP9 | -70 | -65 | -65 | -65 | -55 | -50 | -60 | -50 |  |

METHOD AND ARRANGEMENT FOR DETERMINATION OF THE RADIO COVERAGE IN A MULTICELL MOBILE RADIO SYSTEM

CROSS REFERENCE TO RELATED APPLICATIONS

This application is the US National Stage of International Application No. PCT/EP2006/065022, filed Aug. 3, 2006 and claims the benefit thereof. The International Application claims the benefits of German application No. 10 2005 039 863.4 filed Aug. 23, 2005, both of the applications are incorporated by reference herein in their entirety.

FIELD OF INVENTION

The invention relates to a method for determination of the radio coverage in a multicell mobile radio system, to an arrangement for determination of the radio coverage in a multicell mobile radio system, and to use of the method for finding the position of a mobile terminal.

BACKGROUND OF THE INVENTION

In communication and information technology, terminals, that is to say by way of example cordless telephones, mobile radios, computers, PDAs etc., are frequently operated in a mobile form, and are operated by means of a radio link to a base station, a so-called access point. In order to enlarge the geographical field of use of a mobile terminal such as this, and in order to increase the amount of data or information which can be transmitted at the same time (bandwidth), a plurality of base stations are frequently used at the same time, with one mobile terminal being operated alternately between them. Arrangements such as these are frequently referred to as multicell mobile radio systems and are known in the form of DECT systems for cordless telephones, GSM networks for mobile radios (cellular telephones) and, for example, in the form of WLAN networks for data communication. Conventional multicell mobile radio systems in this case have the common feature that the individual radio cells, that is to say the areas in which the individual base stations can be received, overlap one another, so that a mobile terminal can be moved through the multicell mobile radio system, with a connection being able to be handed over from one base station to another base station in an overlap area between two radio cells. Particularly in geographically small radio networks, it is possible in this case to even be able to receive all of the base stations at some or all locations.

When designing a multicell mobile radio system, care must be taken to ensure that at least one of the base stations can be received with an adequate reception field strength at every location at which a mobile terminal may be intended to operate. Ideally (free-field), it is possible in this case to assume that the reception field strength is distributed radially symmetrically around a base station, so that base stations are often arranged approximately in a square grid on an area to be supplied, so that each base station covers a radio cell with a hexagonal outline, at whose center it is arranged.

In practice, the propagation of radio waves is frequently adversely affected by buildings, the landscape and other elements. Furthermore, the radio base stations do not all have the same transmission power, and do not emit the radio waves radially symmetrically, either. For this reason, radio networks are frequently designed on the basis of rough approximations and on the basis of "provisional" empirical values, and are then "surveyed", that is to say the available reception field strength is recorded by means of a measurement receiver at a multiplicity of measurement points, in order to use these measurement results to successively optimize the radio network. Such recording of the radio coverage is in this case associated with a large amount of often manual effort and, furthermore, must be repeated whenever the radio network itself is changed or an influencing factor (for example local buildings) changes.

Attempts are frequently made to reduce the effects of these disadvantages by "overdesigning" radio networks, that is to say, for example, by choosing the transmission power of the radio base stations to be higher than necessary, or by using an unnecessarily large number of base stations. This is, of course, associated with greater costs and with greater emission of radio-frequency electromagnetic waves.

The data relating to the recorded radio coverage is used not only to ensure area coverage of a radio network but also to find the position of mobile terminals. In the simplest case, the mobile terminal is in this case interrogated via the radio network for the identification numbers of all the base stations which can be received at the present time at its location. In this case, the location of the mobile terminal is emitted as an area which corresponds to the intersection area of all the radio areas (reception areas) of the identified base stations. The position-finding accuracy therefore decreases as the size of the reception areas of the base stations increases.

In the document DE 10 2004 010 182 B3, the stationary base stations in a radio network are used to record the radio coverage. This saves manual measurements and ensures adequate radio coverage in many cases. However, the method provides only a small amount of information about the radio field strengths between the base stations.

In known multicell mobile radio systems, it has disadvantageously been found that the radio coverage must be recorded frequently and precisely for reliable operation, and such recording is associated with a large amount of effort.

SUMMARY OF INVENTION

The object of the present invention is therefore to reduce the effort required to determine the radio coverage in a multicell mobile radio system.

The object is achieved by a method and by an arrangement.

The achievement of the object is based on a method for determination of the radio coverage in a multicell mobile radio system having a multiplicity of base stations, wherein the actual reception field strength of a plurality or all of the base stations is measured at each of a plurality of actual measurement points, which are each at different locations, and wherein the measured values of the actual reception field strengths are entered as actual values on a position-related basis in a database. In this case, values which have in each case been interpolated by means of an interpolation method, for the reception field strengths of a plurality or all of the base stations are calculated from the actual reception field strengths for virtual measurement points which are located between the measurement points and the base stations, and are entered in the database. Furthermore, substitute values for the reception field strength are calculated for further geographical points at which neither measured nor interpolated values are available for the reception field strengths, with the substitute values being calculated on the basis of the respective transmission power, on the basis of the range to the respective base station from this geographical, and on the basis of a propagation model, and with the substitute values calculated in this way being entered in the database. The use of a method such as this makes it possible to make a statement about the base stations which can be received at a respective geographical, and about their reception field strengths, by means of a comparatively small number of measurement points ("support points") for a comparatively large number of geographicals. "Real" measured values are preferably used in this case, with interpolated values being added to them, which have been produced from the actual measured values and, furthermore, with the database having added to it calculated values for those locations at which neither measured values nor interpolated values can be determined. The method therefore results, for every location, in values for the radio coverage which very accurately match the actual circumstances, despite there being only a small number of actual measurement points.

The object is also achieved by an arrangement for determination of the radio coverage in a multicell mobile radio system having a plurality of base stations, having a plurality of actual measurement points, and having a memory device for a multiplicity of reception field strength values. In the arrangement, an evaluation device is provided, and is designed to detect and store actual values for the reception field strength of the base stations at the actual measurement points, wherein the evaluation device is designed for interpolation of virtual measured values, which are formed from the actual measured values, for virtual measurement points which are located between the measurement points, wherein the evaluation device is designed to calculate substitute values for the reception field strength at further points on the basis of the transmission power of the base stations, on the basis of the respective range from the virtual measurement points to the base stations and on the basis of a propagation model, and wherein the detection device is designed to enter the actual measured values, with virtual measured values and the substitute values, as well as the location details about the respective support point associated with them, in the memory device. An arrangement such as this allows detailed and accurate data to be determined about the radio coverage of a multicell mobile radio system, with a small number of measurement points.

The object is also achieved by a method for finding the position of a mobile terminal in a multicell mobile radio system, in which, in a first step, the radio coverage of the multicell mobile radio system is determined using the method as outlined above, and in which, in a second step, the mobile terminal detects the reception field strength of a plurality or all of the base stations which can be received, and in which, in a third step, the reception field strengths which have been detected by the mobile terminal are compared with the determined radio coverage, with that measurement point being output as the location of the mobile radio whose determined reception field strength values best match the reception field strength values detected by the mobile terminal. This method makes it possible to record the position of the mobile terminal with high accuracy.

Advantageous refinements of the method are specified in the claims. The features and advantages described in this case also apply in the same sense to the method and to the arrangement according to the invention.

The actual reception field strengths are advantageously measured at the locations of the base stations. This means that it is possible to use an orthogonal grid, for example in the form of a table, for storage and interpolation of measured values. In this case, it is particularly simple for the actual reception field strengths to be measured by the base stations, with one of the base stations in each case being used alternately as the measurement device for measurement of the reception field strength of at least one of the other base stations. This allows the measured values to be transmitted to an evaluation device via the network infrastructure, that is to say for example via the "backbone" of the base station. Furthermore, this means that there is no need for additional measurement receivers or for walking or driving around the multicell mobile radio system associated with them.

Both the propagation model, by means of which a position-related reception field strength can be estimated on the basis of the transmission power of base stations and on the basis of the range values to the base stations, and the interpolation method for estimation of values for the reception field strength between actual measurement points therefore provide more accurate values the better the method that is used (propagation model, interpolation method) is matched to the actual circumstances. Actual values are advantageously used for selection and/or for correction of the propagation model that is used and/or of the interpolation method that is used, and of their respective parameters. A simple interpolation method can be used if the virtual measurement points are arranged on straight connecting lines between actual measurement points. Equidistant intervals are in this case advantageously chosen between the virtual measurement points.

The precision of the method can be further improved by entering and taking account of special topographical features for the propagation model and/or for the interpolation method. By way of example, walls or ceilings of buildings, which normally attenuate radio signals, can be included as attenuation elements or as virtual paths in the propagation model.

A field strength matrix is advantageously formed from the actual values, the interpolated values and the calculated values for the reception field strengths stored in the database. In this case, a field strength matrix such as this can be further processed particularly easily if the field-strength values recorded in it are linked to an orthogonal and equidistant geographic grid.

BRIEF DESCRIPTION OF THE DRAWINGS

Exemplary embodiments of the method according to the invention will be explained in the following text with reference to the drawings. In the figures, which are at the same time intended to be used to explain an arrangement according to the invention.

DETAILED DESCRIPTION OF INVENTION

The process of determining radio coverage as described in the following text can be used on the one hand to optimize the multicell mobile radio system and on the other hand to find the position of a mobile terminal. The multicell mobile radio system considered in the following text is an arrangement based on the DECT Standard having a plurality of base stations, a so-called DECT multicell system. However, the method can also be used for other radio networks, for example GSM, UMTS, WLAN or WiMax networks.

Figure 1A:
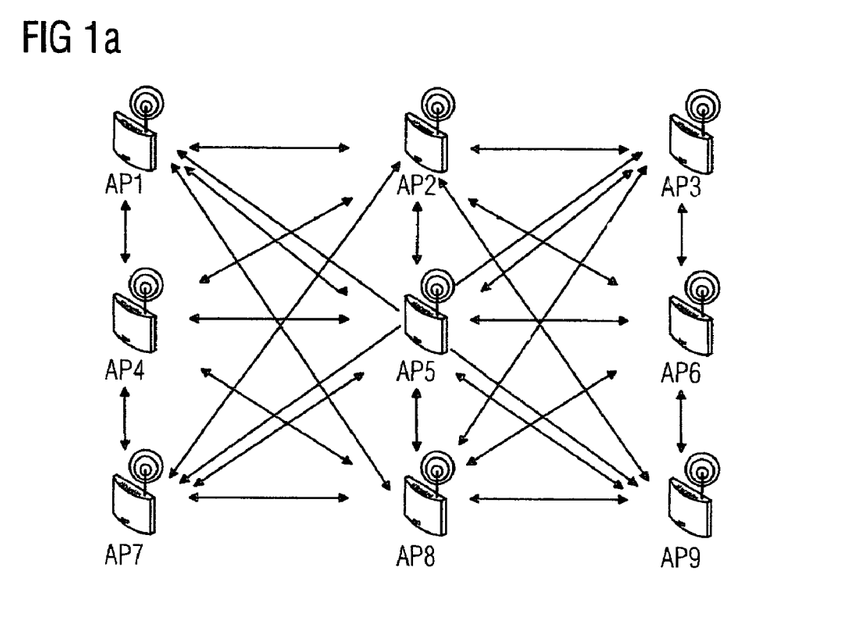
FIG. 1*a* shows a schematic illustration of an arrangement comprising nine base stations in a multicell mobile radio system, and the measurements of the reception field strengths carried out by the base stations.

One such multicell mobile radio system is illustrated schematically in FIG. 1a, with base stations AP1 . . . AP9 (access points) being arranged in an orthogonal grid over a land area. In this case, the distances between the individual base stations AP1 . . . AP9, the respective transmission power and the respective polar diagram of the base stations AP1 . . . AP9 are known. The present exemplary embodiment is based, for simplicity, on the assumption that the base stations AP1 . . . AP9 are arranged in a square grid, all operate using the same transmission power, and have a radially symmetrical propagation characteristic over the horizontal area.

The method described in the following text is based on measurement of the reception field strengths of all the receivable base stations AP1 . . . AP9 for different (actual measurement points), so-called support points. As an alternative to the option of carrying out these measurements manually by walking over the land area with the measurement receiver, this makes use of the capability to successively switch one of the base stations AP1 . . . AP9 in each case to a measurement mode, and to record the reception field strength at the location of each of the other base stations AP1 . . . AP9. In this case, it is not possible, of course, to record the reception field strength of the base station AP1 . . . AP9 which is in each case carrying out the measurement; however, it is self-evident that the reception field strength of the respective base station corresponds to a maximum value in the vicinity of that respective location, resulting inter alia from the transmission power of the respective base station AP1 . . . AP9.

Figure 1B:
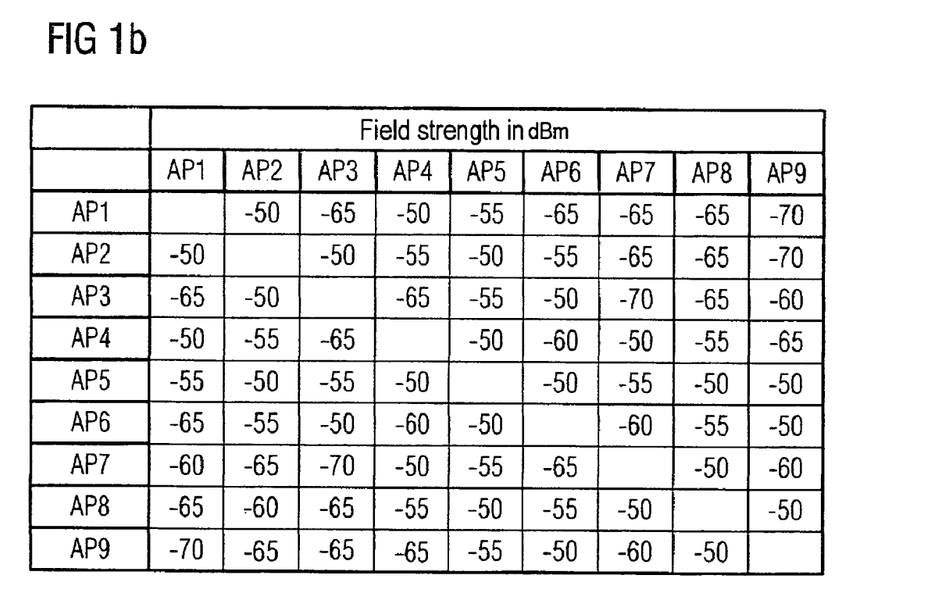
FIG. 1*b* shows an illustration in the form of a table of reception field strengths recorded by base stations.

The reception field strengths of the respectively other base stations AP1 . . . AP9 as measured by the base stations AP1 . . . AP9 are stored in a database (not illustrated) for an evaluation device, which in this case is a component of a communication system (likewise not illustrated) to which the base stations AP1 . . . AP9 are connected. The measured-value pairs stored there are shown in the form of a table in FIG. 1b, in which case the asymmetry of some of the measured values indicates that, despite the orthogonal arrangement of the base stations AP1 . . . AP9, the "ideal" radially symmetrical propagation of the radio waves and of the homogeneous transmission power does not necessarily result in a radio field corresponding to the theory. For example, the base station AP6 can be received at −65 dBm at the location of the base station AP7 while, in contrast, the base station AP7 can be received at −60 dBm at the location of the base station AP6. This "asymmetry" may be caused on the one hand by special geographic features (for example obstructions in the form of buildings, plants etc.,) and on the other hand the discrepancy from the "ideal state" may be caused by measured tolerances or for some similar reason.

The base stations AP1 . . . AP9 known from FIG. 1a are shown again in FIG. 2. A (theoretical) reception field strength is calculated from the (known) transmission powers of the base stations AP1 . . . AP9 for all the support points, which are represented by black dots in the figure, that is to say the radio field strength with which each base station can supposedly be received is calculated for each of the illustrated points. The present example is based on a simple propagation model which assumes that the reception field strength for a base station decreases continuously as the range from this base station increases, to be precise radially symmetrically around the respective base station. Different propagation models may, of course, also be used as the basis, in particular those which take account of special geographic features, for example buildings or the like.

Figure 2:
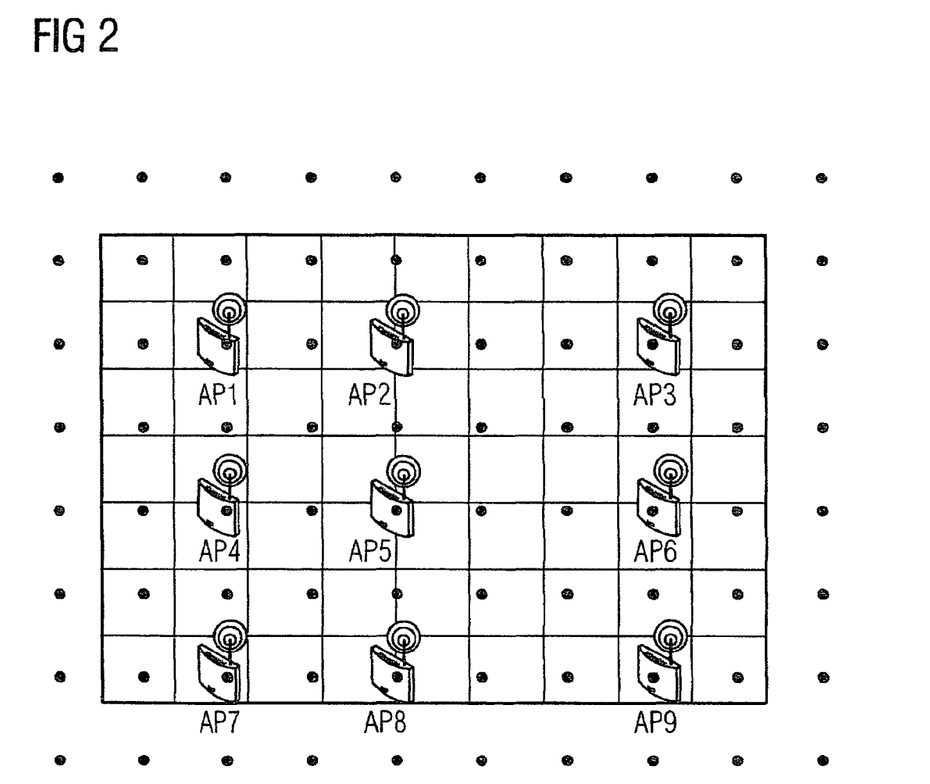
FIG. 2 shows the arrangement comprising nine base stations with geographicals for which reception field strengths are calculated by means of a propagation model.

In the present exemplary embodiment, the geographical points for the "theoretical" substitute values for the reception field strengths are likewise arranged in an orthogonal grid, to be precise such that a geographical for the support points for the substitute values is also in each case arranged for each position of the base stations. This means that not only is a set of the actually measured reception field strengths of the other base stations AP1 . . . AP9 available for each geographic position of a base station, but also a set of values which have been calculated on the basis of the propagation model. Ideally, the actually measured values and the calculated values should be identical; in practice, there are, of course, discrepancies which are caused on the one hand by measurement tolerances and on the other hand by the discrepancies which obviously exist between a theoretical model and practical propagation. Since, however, on the one hand model parameters and on the other initial values in the form of transmission field strengths and transmission powers, possibly as well as geographic details, are used as the basis for the propagation model and the algorithms that result from this for calculation of the substitute values, these parameters that are used for calculation purposes can optionally be corrected by means of the measured values.

In the abovementioned situation, in which the grid of calculated substitute values is identical to the grid in which the measurements are carried out, the calculated substitute values for each point for which there is a measured value are replaced by that measured value, and are entered in the database. In the situation where the grids are not precisely coincidental, substitute values are replaced by measured values which are in the vicinity, provided that the geographic discrepancy is less than a threshold value (so-called "catchment area"). In consequence, the "support points" which are recorded in the database are also in a standard orthogonal grid when the grids for the substitute values and for the measured values are shifted with respect to one another or have a different stepwidth (grid size).

The multicell mobile radio system can be improved (optimized) after its initial installation just on the basis of the measured "real" values and on the basis of the substitute values, by adjusting the number and position of the base stations AP1 . . . AP9 and their transmission powers such that at least one or two base stations AP1 . . . AP9 can be received with a minimum reception field strength at each support point and therefore also with a high probability at each point between the support points. Such optimization, in particular the optimization of the parameters for the propagation model which may be associated with this, is repeated whenever the geographic conditions change, for example as a result of building changes being carried out, or when base stations AP1 . . . AP9 are changed or moved.

FIG. 2 has been used as the basis to explain that it can be assumed for those geographicals which match neither the base stations AP1 . . . AP9 nor those points for which substitute values have been calculated that the conditions (reception field strengths) are similar there to those at the adjacent points (support points) for which values have already been entered in the database (measured values, substitute values). This is often also sufficient to ensure a minimum reception field strength, particularly when values for the reception field strength which go beyond the required minimum level are available at the "known" support points. Nevertheless, particularly for radio position-finding purposes, it is desirable to have more accurate information for the reception field strength at those points which are located between the support points which are known as a result of measurements or those "estimated" in calculations based on models.

Figure 3:
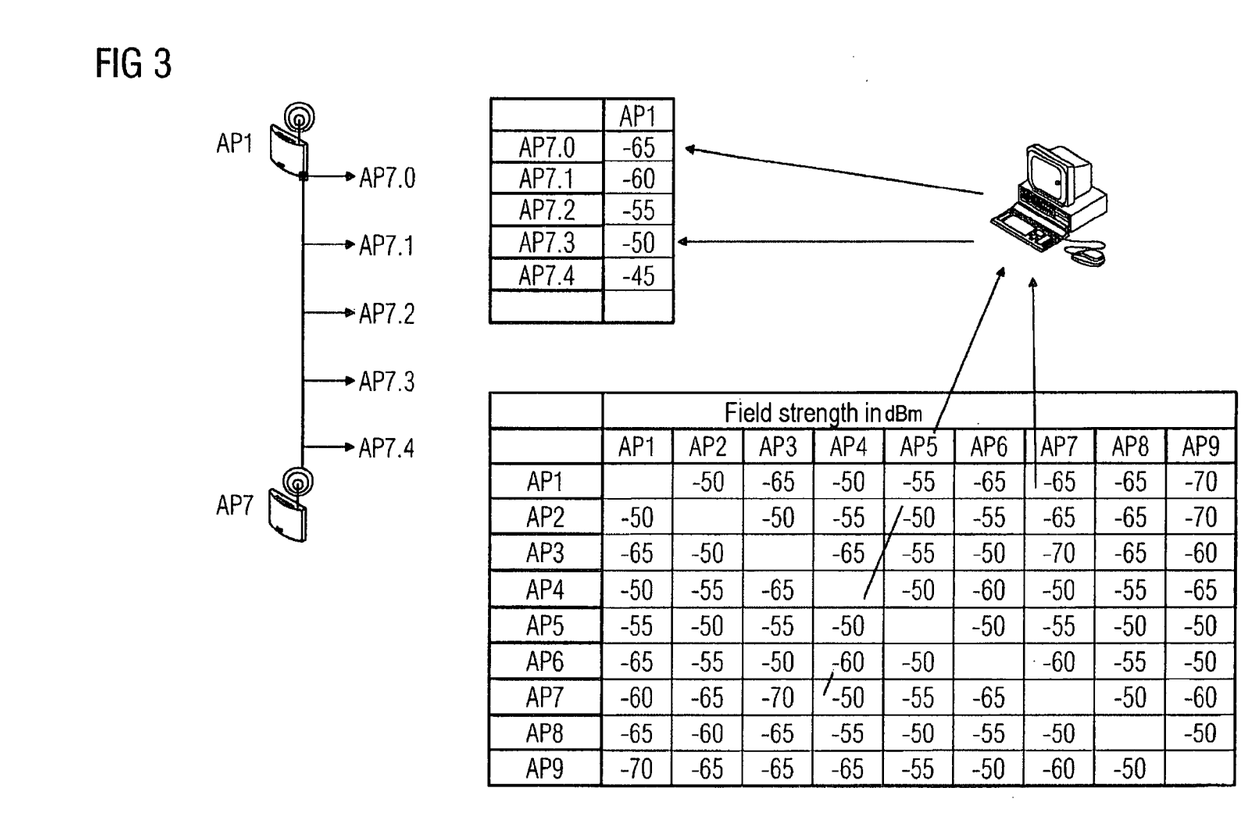
FIG. 3 shows the interpolation of values for the reception field strengths between two base stations.

In addition to the actually measured values and the substitute values, which are calculated for each base station AP1 . . . AP9 from this transmission power of the base station and the distance to the base station AP1 . . . AP9 a third type of value is formed for the reception field strength by interpolation from actual measured values, specifically the so-called interpolated values. FIG. 3 schematically illustrates the interpolation for such interpolated values on the basis of the distance between the base stations AP1 and AP7. This is done by firstly reading from the table in FIG. 1b that value with which the base station AP7 can be received at the location of the base station AP1, in this case −65 dBm. This value, which is measured by the base station AP1 itself in the present exemplary embodiment, represents the initial value for the interpolation. Another parameter for the interpolation is the magnitude of the distance between the base stations AP1 and AP7 and the number of support points to be calculated, in this case five, from which an appropriate stepwidth is obtained. In addition to the first support point, which results from the measurement result of the base station AP1 (−65 dBm), at least one further support point is required for interpolation, in this case the value measured by the base station AP4, with the base station AP4 being located on the direct path between the base stations AP1 and AP7. The base station AP7 can be received at −50 dBm at the location of the base station AP4; this value is used as the "virtual measurement point" 7.3, so that the virtual measurement points 7.1 and 7.2 are determined by linear interpolation, and are entered in the table or database. Interpolated values can once again be interpolated for the path between the measurement point 7.3, which, strictly speaking, is a virtual measurement point and an actual measurement point at the same time, and the location of the base station AP7, with a value having to be estimated for the reception field strength at the location of the base station AP7 because no actual measured value is available for this. Alternatively, the values 7.4 etc. can also be extrapolated from the first step (values 7.1, 7.2); there is then no "estimate" for the support point for the base station AP7.

A large number of interpolated values for virtual measurement points can be calculated using this method for all direct paths between the base stations AP1 . . . AP9, in which case these interpolated values differ, statistically on average, less from reality than the calculated values, because the interpolated values use actual measured values as support points.

If there is no intention of increasing the number of support points for the database, substitute values recorded in the database are replaced by the corresponding interpolated values at the respective support points unless an actual measured value is available for the respective support point. If the geographic position of the respective interpolated value in this case does not precisely match a grid point for the substitute values (non-coincident grids), the value can nevertheless be replaced provided that the discrepancy (distance) between the two points is below a threshold value, for example 2 meters. In consequence, the database contains not only the field strength values but also their grid size and their orthogonal structure, which simplifies subsequently use of the database.

Figure 4:
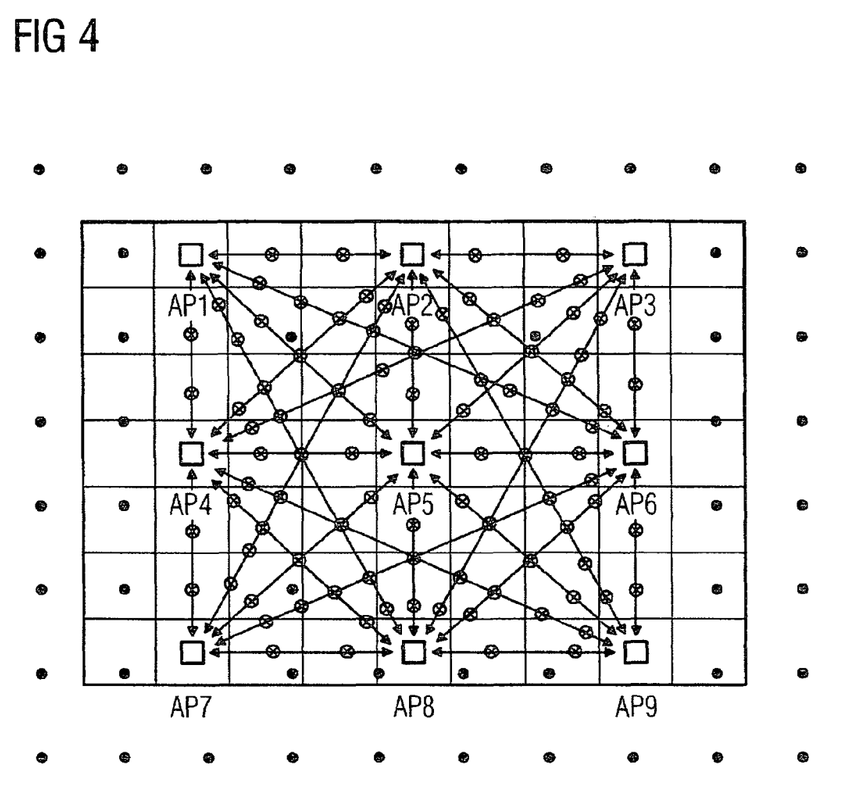
FIG. 4 shows a schematic illustration showing the nine base stations and geographicals for which measured reception field strengths, interpolated reception field strengths and calculated reception field strengths are available.

The result of the production of values for the reception field strengths using all three method elements described so far is summarized in FIG. 4. In this case, the black, solid circles show geographicals for which calculated values are used for the reception field strengths of all the base stations AP1 . . . AP9. Actual measured values are used at those points which are represented by squares and in this exemplary embodiment coincide with the locations of the base stations AP1 . . . AP9, with the respective exception of the reception field strengths of those base stations which are located at the respective point itself. Finally, as can be seen from FIG. 1b, there are no measured values on the diagonal of the table. Finally, the measurement points (support points) for interpolated values are shown for virtually all the points between the base stations AP1 . . . AP9 which are represented by crossed-through circles, and, wherever they are available, these interpolated values are used by preference over the calculated values. The associated database therefore has a set with nine values for the reception field strengths of the nine base stations AP1 . . . AP9 for each of the points illustrated in FIG. 4, with each of these values matching reality as well as possible.

Figure 5:
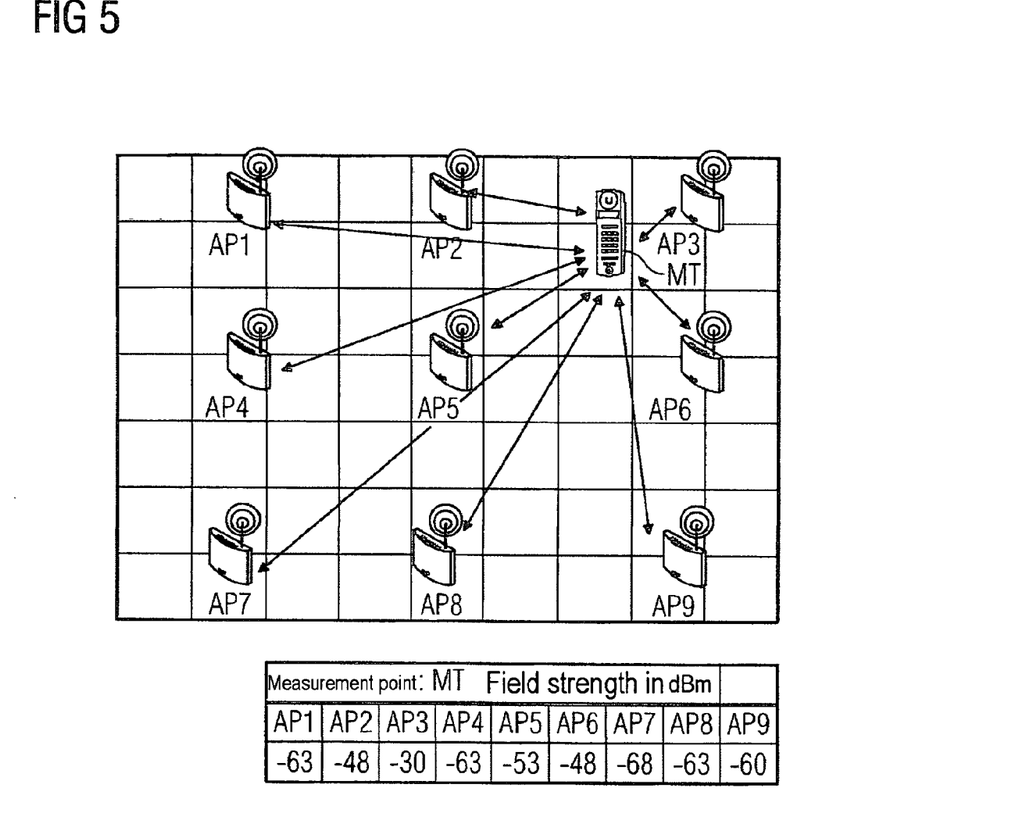
FIG. 5 shows a schematic illustration for finding the position of a mobile terminal in a multicell mobile radio system.

FIG. 5 schematically illustrates the process of finding the position (locating) a mobile terminal in the multicell mobile radio system which is formed from the base stations AP1 . . . AP9. For position finding, the mobile terminal receives via its radio interface a command, in response to whose reception the mobile terminal MT transmits back a data record which in this case comprises nine measured values, with the nine measured values comprising the reception field strength for each of the nine received base stations AP1 . . . AP9. An evaluation device (not illustrated) in a central server now compares the data records from the database with the data record produced by the mobile terminal MT, and in this case uses the database to determine that data record which is closest to the measured data record. In the present exemplary embodiment, the difference is formed for this purpose for each base station AP1 . . . AP9 between the measured value and the value in the database, to be precise for each measurement point (support point) that is available in the database. The sum of the squares of the discrepancies for the base stations AP1 . . . AP9 is formed, and is stored as a value, for each available measurement point. That measurement point which has the smallest value is assumed to be the one which is closest to the current location of the mobile terminal MT.

As an alternative to this simple calculation method, it is also possible to use other calculation methods. In particular, it is possible to determine a small number of close measurement points and to once again carry out an interpolation process, in order to produce further virtual measurement points, between the individual field strength values at these measurement points. In order to output the position that has been determined in this way, it is helpful to store coordinate details and/or a location identification for each measurement point in the database. Alternatively, the database can be used to store only those measurement points which, for example, correspond to a square grid, so that a specific location can be deduced by an order number of the corresponding data record in the database.

The invention claimed is:

1. A method for determination of the radio coverage in a multicell mobile radio system having a plurality of base stations, each of the base stations positioned at a respective base station location, the method comprising:
   measuring actual reception field strength of the base stations at the base station location for each of the base stations; and
   entering the measured values of the actual reception field strengths as actual values on a position-related basis in a database,
   wherein the measurements of the actual reception field strengths are carried out by the base stations with one of the base stations in each measurement being used alternately as a measurement device for measurement of the actual reception field strength of at least one of the other base stations.

2. The method of claim 1 further comprising:
interpolating interpolation values calculated from the actual reception field strengths via an interpolation method for the reception field strengths of the base stations for virtual measurement points located between actual measurement points and the at least one base station of the base stations;
providing the interpolated values to the database;
calculating substitute values for the reception field strength for geographical points, each of the substitute values being calculated based on a propagation model; and
providing the substitute values to the database.

3. A method for determination of the radio coverage in a multicell mobile radio system having a plurality of base stations, each of the base stations positioned at a respective base station location, the method comprising:
measuring actual reception field strength of the base stations at the base station location for each of the base stations;
entering the measured values of the actual reception field strengths as actual values on a position-related basis in a database;
wherein the measurements of the actual reception field strengths are carried out by the base stations with one of the base stations in each measurement being used alternately as a measurement device for measurement of the reception field strength of at least one of the other base stations;
interpolating values calculated from the actual reception field strengths via an interpolation method for the reception field strengths of at least one of the base stations for virtual measurement points located between actual measurement points and the at least one base station of the base stations and entering the interpolated values in the database; and
calculating substitute values for the reception field strength for geographical points at which neither measured nor interpolated values are available for the reception field strengths, each of the substitute values being calculated based on: respective transmission power of one of the base stations, range to the respective base station from one of the geographical points, and a propagation model, and entering the substitute values in the database.

4. The method as claimed in claim 3, wherein actual values are used for selection and/or for correction of the propagation model, used for calculation of the field strength values, and/or propagation model parameters.

5. The method as claimed in claim 4, wherein actual values are used for selection and/or for correction of the interpolation method used.

6. The method as claimed in claim 5, wherein the virtual measurement points are arranged on straight connecting lines between the actual measurement points.

7. The method as claimed in claim 6, wherein special topographical features are taken into account for the propagation model and/or the interpolation method.

8. The method as claimed in claim 7, wherein a field strength matrix is formed from the actual measured values, interpolated values, and the substitute values for the reception field strengths stored in the database.

9. A method for finding a position of a mobile terminal in a multicell mobile radio system, comprising:
determining the radio coverage of the multicell mobile radio system by:
measuring the actual reception field strength of a plurality of the base stations at each of the base station locations,
entering the measured values of the actual reception field strengths as actual values on a position-related basis in a database,
wherein the measurements of the actual reception field strengths are carried out by the base stations with one of the base stations in each case being used alternately as a measurement device for measurement of the reception field strength of at least one of the other base stations;
detecting by the mobile terminal the reception field strengths of a plurality of the receivable base stations; and
comparing the reception field strengths that have been detected by the mobile terminal with the determined radio coverage, the position of the mobile terminal being where a measurement point determined from one of the measured values best matches the reception field strength values detected by the mobile terminal.

10. An arrangement for determination of the radio coverage in a multicell mobile radio system having a plurality of base stations and a plurality of actual measurement points, comprising:
a plurality of base stations, each of the base stations measuring an actual reception field strength, each of the base stations alternately measuring the reception field strength of at least one of the other base stations;
a memory device for storing a plurality of reception field strength values;
an evaluation device comprising a detection device that detects actual values for the reception field strength of the base stations at the actual measurement points, and
wherein the detection device stores the actual values for the reception field strength of the base stations at the actual measurement points in the memory device,
wherein the evaluation device interpolates virtual measured values formed from the actual measured values for virtual measurement points located between the measurement points,
wherein the evaluation device calculates substitute values for the reception field strength at geographic points based on:
transmission power of the base stations,
respective range from the virtual measurement points to the base stations, and
a propagation model, and
wherein the evaluation device enters the actual measured values, the virtual measured values, the substitute values, and location details about the respective measurement points associated with them in the memory device.

11. The arrangement of claim 10 wherein the evaluation device interpolates virtual measured values formed from the actual measured values for virtual measurement points located between the measurement points by using a linear interpolation method.

12. A method for determination of the radio coverage in a multicell mobile radio system having a plurality of base stations, each of the base stations positioned at a respective base station location, the method comprising:
measuring actual reception field strength of the base stations at the base station location for each of the base stations;
entering the measured values of the actual reception field strengths as actual values on a position-related basis in a database, wherein the measurements of the actual reception field strengths are carried out by the base stations with one of the base stations in each measurement being used alternately as a measurement device for measurement of the reception field strength of at least one of the other base stations;

interpolating interpolation values calculated from the actual reception field strengths via an interpolation method for the reception field strengths of the base stations for virtual measurement points located between actual measurement points and the at least one base station of the base stations;

providing the interpolated values to the database;

calculating substitute values for the reception field strength for geographical points, each of the substitute values being calculated based on a propagation model;

providing the substitute values to the database; and wherein if any of the interpolated values are for geographical locations in which any of the substitute values are available, the substitute value for that geographical location is deleted and the interpolated value is used.

13. A method for determination of the radio coverage in a multicell mobile radio system having a plurality of base stations, each of the base stations positioned at a respective base station location, the method comprising:

measuring actual reception field strength of the base stations at the base station location for each of the base stations;

entering the measured values of the actual reception field strengths as actual values on a position-related basis in a database, wherein the measurements of the actual reception field strengths are carried out by the base stations with one of the base stations in each measurement being used alternately as a measurement device for measurement of the reception field strength of at least one of the other base stations;

interpolating interpolation values calculated from the actual reception field strengths via an interpolation method for the reception field strengths of the base stations for virtual measurement points located between actual measurement points and the at least one base station of the base stations;

providing the interpolated values to the database;

calculating substitute values for the reception field strength for geographical points, each of the substitute values being calculated based on a propagation model; and providing the substitute values to the database; and wherein if any actual reception field strength values are for geographical locations in which any of the substitute values are available, the substitute value for that geographical location is deleted and the actual reception field strength value is used.

14. A method for determination of the radio coverage in a multicell mobile radio system having a plurality of base stations, each of the base stations positioned at a respective base station location, the method comprising:

measuring actual reception field strength of the base stations at the base station location for each of the base stations;

entering the measured values of the actual reception field strengths as actual values on a position-related basis in a database, wherein the measurements of the actual reception field strengths are carried out by the base stations with one of the base stations in each measurement being used alternately as a measurement device for measurement of the reception field strength of at least one of the other base stations;

interpolating interpolation values calculated from the actual reception field strengths via an interpolation method for the reception field strengths of the base stations for virtual measurement points located between actual measurement points and the at least one base station of the base stations;

providing the interpolated values to the database;

calculating substitute values for the reception field strength for geographical points, each of the substitute values being calculated based on a propagation model;

providing the substitute values to the database; and storing at least one of coordinate details and location identification for each of the interpolated values, substitute values and the actual values.

15. The method of claim 14 further comprising associating at least one of coordinate details and location identification for each of the interpolated values, substitute values and the actual values in the database such that a specific location is identifiable for each of the interpolated values, the substitute values and the actual values.

16. A method for determination of the radio coverage in a multicell mobile radio system having a plurality of base stations, each of the base stations positioned at a respective base station location, the method comprising:

measuring actual reception field strength of the base stations at the base station location for each of the base stations;

entering the measured values of the actual reception field strengths as actual values on a position-related basis in a database, wherein the measurements of the actual reception field strengths are carried out by the base stations with one of the base stations in each measurement being used alternately as a measurement device for measurement of the reception field strength of at least one of the other base stations;

interpolating interpolation values calculated from the actual reception field strengths via an interpolation method for the reception field strengths of the base stations for virtual measurement points located between actual measurement points and the at least one base station of the base stations;

providing the interpolated values to the database;

calculating substitute values for the reception field strength for geographical points, each of the substitute values being calculated based on a propagation model;

providing the substitute values to the database; and storing at least one of coordinate details and location identification for the interpolated values and associating the at least one of coordinate details and location identification for the interpolated values.

* * * * *